United States Patent Office 3,849,351
Patented Nov. 19, 1974

3,849,351
PAVEMENT MARKING MATERIAL CONTAINING A POLYAMIDE MODIFIED BY A DIPHENOLIC ACID
Jens L. Jorgensen, White Bear Lake, Minn., assignor to Minnesota Mining and Manufacturing Company, St. Paul, Minn.
No Drawing. Continuation of abandoned application Ser. No. 181,240, Sept. 16, 1971. This application Sept. 13, 1973, Ser. No. 397,160
Int. Cl. C08g 51/04
U.S. Cl. 260—18 N                                         7 Claims

ABSTRACT OF THE DISCLOSURE

An improved particulate marking material for application to paved surfaces by the method of Harrington, U.S. Pat. 3,410,185. Use in the marking material of a polyamide made from diphenolic acid as one ingredient has been found to improve durability of applied lines of the marking material.

---

This is a continuation of application Ser. No. 181,240, filed Sept. 16, 1971, now abandoned.

Harrington, U.S. Pat. 3,410,185, teaches a method for forming pavement markings that bear traffic within seconds after application. This method uses solid, particulate, thermoplastic-based marking material and comprises the steps of (1) heating the paved surface, (2) projecting the individual solid particles of marking material toward the heated pavement, and (3) heating the particles as they proceed toward the pavement to at least soften a major portion of an organic thermoplastic phase of the particles. Upon striking the heated pavement, the particles first flow, coalesce, and form a continuous film and then rapidly cool to a nontacky condition. Within seconds after the particles strike the pavement, a marking has been formed that will bear traffic without marring or transfer of the marking material.

This method for forming pavement markings has found a large acceptance in the industry. In one large use for the method, traffic-control markings are applied at intersections with small operator-propelled applicators, such as taught in U.S. Pat. 3,393,615. These applicators preheat the roadway with a flame, and the particles are heated by projection through the flame. The markings are conveniently and rapidly formed with little if any interruption of traffic.

Next to the ability to bear traffic rapidly, a general goal for markings prepared by the described method is that they exhibit as long a life on the paved surface or roadway as markings formed by conventional liquid paint compositions. The markings formed from presently available particulate marking materials have not always exhibited that long a life, especially in geographic areas that experience freeze-thaw temperature cycles, and especially on concrete pavement. As a result, improved durability has been established as a major objective of research on particulate pavement marking materials.

SUMMARY OF THE INVENTION

The present invention provides a particulate marking material that may be applied by the method described in Harrington, U.S. Pat. 3,410,185, which is incorporated herein by reference, to form pavement markings of better durability than those formed from prior art marking materials. This new particulate marking material comprises solid thermoplastic-based particles having an organic thermoplastic phase that principally comprises polyamide condensation products of polycarboxylic acid and polyamine, just as the principal prior particulate marking materials do. But the polyamides in the new marking material are different from those in prior art marking materials in that at least one weight-percent of the ingredients from which the polyamides are prepared is a diphenolic acid, of which the following is a typical structure:

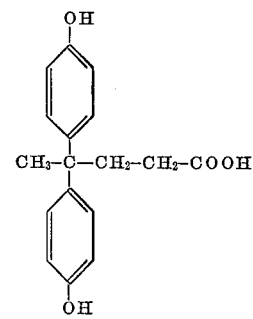

Diphenolic acids and their preparation are described in U.S. Pat. 2,933,520. Polyamides may be made using diphenolic acid and other acids, such as polymerized fatty acids, and polyamines as described in U.S. Pat. 2,933,517.

As was true of the prior art marking materials, the organic phase of the thermoplastic-based particles of this invention generally constitutes on the average at least 25 volume-percent and preferably at least 50 volume-percent of the thermoplastic-based particles. Beside the organic phase, these thermoplastic-based particles generally include coloring agents in an amount of at least 1 or 2 volume-percent of the particles, this coloring agent usually being an inorganic hiding-type pigment of the usual fine sizes.

The thermoplastic-based particles exhibit the balance of different, somewhat competing, characteristics or properties set out in the Harrington patent for use in the described method. That is, the thermoplastic-based particles are nontacky, nonblocking, and free-flowing at normal ambient temperatures (up to about 120° F.), meaning that the particles are separate and discrete when projected toward the roadway. These thermoplastic-based particles are small in diameter (generally they all pass a 20-mesh U.S. Standard screen, with about 80 weight-percent or more being retained on a 200-mesh screen, and preferably they pass a 40-mesh screen and at least 80 weight-percent are retained on a 100-mesh screen), and they melt or solidify quickly, softening during their short travel to the pavement surface and then rapidly returning to the solid state after the application equipment passes by. These thermoplastic-based particles develop good adhesion to the pavement surface and have a sufficiently low melt-viscosity so as to coalesce and penetrate into the interstices of a paved surface. As recited in the Harrington patent, the necessary flowability is roughly indicated when the organic phase of the coating material exhibits a melt viscosity of less than 4000 centipoises at 300° F. and less than 15,000 centipoises at 250° F. To achieve that, the polyamides generally have a melt-viscosity of less than about 10,000 centipoises at 300° F. However, the improved properties of materials of the invention extend the useful melt-viscosities to somewhat higher values.

Glass beads are preferably included in the marking material to improve the reflectivity of an applied marking. Retroreflectivity may also be provided with other retroreflective elements or glass cullet particles. Other particulate material that is nonmelting at the temperatures of application, such as sand particles, may be included either in addition to or instead of the glass beads to improve the wear of an applied marking and to control the flow of the material when molten on the roadway. The non-melting particulate material—glass beads or other nonmelting particulate material—generally falls within the same size range as the thermoplastic-based particles and generally constitutes no more than 50 volume-percent of the marking material. Usually glass beads or other non-melting particulate material constitute 5 or more volume-percent of the coating material, though as little as 1 volume-percent will provide some retroreflectivity and has beneficial effects on wear and flow properties.

DETAILED DESCRIPTION

The invention will be illustrated by the following examples:

Example 1

Pigmented thermoplastic-based particles in a size range of about 40–100 mesh were prepared from the following ingredients:

| | Parts by Weight |
|---|---|
| Polyamide reaction product of diphenolic acid, polymerized fatty acid, and alkylene diamine softening at approximately 98–102° C., having a Gardner-Holdt viscosity (40% resin in 91% isopropanol) of I and a kinematic viscosity at 160° C. of 26–34, the diphenolic acid comprising about 10 weight-percent of the ingredients (Emerez 1533 made by Emery Industries) | 54.6 |
| Polyamide reaction product of polymerized fatty acid and alkylene diamine melting at approximately 204° F. (by the Durran mercury method) and having a viscosity at 300° F. of 3,000 centipoises and at 250° F. of 13,600 centipoises (Sunkem 526-G made by Sun Chemical) | 14 |
| Hydrogenated tallow amide (crystalline wax-like material having a melting point of 208–217° F. and a melt viscosity at 300° F. of 4.5; Armid HT made by Armour) | 1.4 |
| Titanium dioxide pigment | 30 |
| Dimethylpolysiloxane flow agent (Dow Corning's D.C. 200) | 0.03 |

The organic ingredients were melted and stirred together in a kettle heated to 300° F. (at 300° F.) these organic ingredients had a viscosity (Brookfield with No. 2 spindle and appropriate rate of rotation) of 3400 centipoises. The pigment was then dispersed in the melt and the resulting mixture spread into a thin layer. When the mixture had cooled to room temperature and was solid, it was ground into particles. Glass beads between 30 and 350 microns in size were then mixed into the ground thermoplastic-based powder in an amount constituting about 33 weight-percent of the combination.

When marking material of this example and marking material as described in Example 2 of Harrington, U.S. Pat. 3,410,185 were both applied to various test pavements through a flame-applicator by the method of the Harrington patent and exposed to various environmental and traffic conditions, the marking material of this example consistently out-performed the marking material of the patent in durability and longevity. For example, when observed at specified intervals and judged according to the test labeled Degree of Chipping in ASTM D 193, the applied markings of this example consistently outrated the applied markings of the patent.

Example 2

Example 1 was repeated except that the first polyamide in the formulation (Emerez 1533) was replaced with a different polyamide (Emerez 1536). The polyamide of this example was similar to the polyamide of Example 1 except that it included about 10 percent more diphenolic acid, had a Gardner-Holdt viscosity under the conditions described of about B, and had a kinematic viscosity of 3.5–5.0 poises at 160° C. The combination of organic ingredients had a melt viscosity at 300° F. (Brookfield, No. 2 spindle) of 632 centipoises. Marking material of this example when applied to a roadway through a flame-applicator according to the method of the Harrington patent formed markings of about the same characteristics as the markings formed by the marking material of Example 1.

It is preferred that polyamides formed from polymerized fatty acids be used in marking materials of the invention, and accordingly, it is preferred that the diphenolic acid ingredient be incorporated in such a polyamide. Polymerized fatty acids may be prepared by polymerization of the fatty acids of drying or semi-drying oils, e.g. linseed, soybean, or cottonseed oil, by any of a number of well-known methods; see, for example, the article by C. G. Goebel entitled "Polymerization of Unsaturated Fatty Acids," appearing in the March 1947 issue of the Journal of the American Oil Chemists' Society. Other polyamide reaction products of polycarboxylic acids and polyamines are also useful, including linear polyamides formed by reaction of aliphatic polycarboxylic acids and aliphatic polyamines. Polyamides that have amine functionality (such that they have an amine number of 55, for example) are useful and give good adhesion to the roadway. Polyamides generally comprise 50 volume-percent or more of the organic phase in the thermoplastic-based particles of the invention.

One weight-percent of diphenolic acid as an ingredient in polyamide material of the invention will improve durability of an applied line, but diphenolic acid preferably constitutes at least 5 weight-percent of the ingredients of the polyamide material. Generally, the more the diphenolic acid in the polyamide, the lower will be the molecular weight and viscosity of the polyamide, and accordingly the maximum amount of polyamide is determined by the need for the thermoplastic-based particles to be solid, nontacky, nonblocking and free-flowing at normal ambient temperatures. To assure that a reduced viscosity does not cause the thermoplastic-based particles to block (that is, become adhered to one another) during storage or use, the particles may be given a coating of talc or other non-tacky material.

Organic additives may be included in the organic phase to add certain properties such as lower melt viscosity and adhesion promotion. For example, solid, organic, low-molecular-weight modifying material that has a sharp melting point within the range of 150° F. to 300° F., exhibits a melt-viscosity of less than 100 centipoises at 300° F., and when melted is a solvent for the polyamide condensation project is useful as a viscosity reductant in compositions of the invention. When included, it generally consistutes between 1 and 25 weight-percent of the organic phase. In the above example the halogenated tallow amide is such a modifying material. The polysiloxane oil in the above example reduces any bleeding of asphalt materials through an applied marking. Viscosity and flow of the molten particles are further improved by using only low amounts of pigment in the particle.

What is claimed is:
1. Marking material for forming pavement markings that bear traffic within seconds after application comprising
   (I) solid thermoplastic-based particles that are nontacky, nonblocking, and free-flowing at normal ambient temperatures but adapted to melt, coalesce, and form a continuous adherent film when applied to a pavement surface at a useful elevated temperature, the particles passing a screen of about 20 mesh, with at least about 80 weight-percent being retained on a screen of about 200 mesh and comprising
      (A) an organic thermoplastic phase that
         (1) constitutes on the average at least 25 volume-percent of the particles,
         (2) melts at a temperature above about 150° F. and forms a low-viscosity fluid melt below about 300° F., and

(3) comprises polyamide condensation products of polycarboxylic acid and polyamine that account for at least 50 volume-percent of the organic phase, at least one weight-percent of the ingredients from which the polyamide condensation products were formed being diphenolic acid; and (B) a coloring agent in an amount that constitutes at least one volume-percent of the particles; and (II) particulate material that is nonmelting at the temperature of application, is approximately within the size range of the thermoplastic-based particles, and is present in an amount between about 1 and 50 volume-percent of the whole marking material.

2. Marking material of claim 1 in which the nonmelting particulate material is transparent glass beads.

3. Marking material of claim 1 in which the organic thermoplastic phase further includes a solid organic low-molecular-weight material in an amount comprising between 1 and 25 weight-percent of the organic phase, said low-molecular-weight material having a sharp melting point within the range of 150° F. to 300° F., exhibiting a melt-viscosity of less than 100 centipoises at 300° F., and when melted being a solvent for the polyamide condensation product.

4. Marking material for forming pavement markings that bear traffic within seconds after application comprising (I) solid thermoplastic-based particles that are non-tacky, nonblocking, and free-flowing at normal ambient temperatures but adapted to melt, coalesce, and form a continuous, adherent film when applied to a pavement surface at a useful elevated temperature, the particles passing a screen of about 20 mesh, with at least 80 weight-percent being retained on a screen of about 200 mesh and comprising (A) an organic thermoplastic phase that
(1) constitutes on the average at least 25 volume-percent of the particles,
(2) melts at a temperature above about 150° F. and forms a low-viscosity fluid melt below about 300° F., and
(3) comprises polyamide condensation products of polycarboxylic acid and polyamine that account for at least 50 volume-percent of the organic phase, at least five weight-percent of the ingredients from which the polyamide condensation products were made being diphenolic acid;

(B) a coloring agent in an amount that constitutes on the average at least 1 volume-percent of the particles; and (II) transparent glass beads in about the same size range as the thermoplastic-based particles and in an amount between about 1 and 50 volume-percent of the whole marking material.

5. An adherent marking on a paved surface comprising solid thermoplastic-based particles applied to the paved surface in heated form where they flowed together and coalesced, the particles comprising an organic thermoplastic phase that (1) constitutes on the average at least 25 volume-percent of the particles,
(2) melts at a temperature above about 150° F. and forms a low-viscosity fluid melt below about 300° F., and
(3) comprises polyamide condensation products of carboxylic acid and amine that account for at least 50 volume-percent of the organic phase, at least one weight-percent of the ingredients from which the polyamide condensation products were formed being diphenolic acid.

6. Marking material of claim 1 in which the polycarboxylic acid comprises a polymerized fatty acid.

7. Marking material of claim 4 in which the polycarboxylic acid comprises a polymerized fatty acid.

References Cited

UNITED STATES PATENTS

| 3,410,185 | 11/1968 | Harrington | 94—22 |
| 3,664,242 | 5/1972 | Harrington et al. | 94—22 |
| 3,496,060 | 2/1970 | Pitz et al. | 260—18 |
| 3,268,461 | 8/1966 | Jacobson | 260—18 |
| 2,933,517 | 4/1960 | Greenlee | 260—404.5 |
| 3,597,376 | 8/1971 | Tashiro et al. | 260—18 |

DONALD E. CZAJA, Primary Examiner

E. C. RZUCIDLO, Assistant Examiner

U.S. Cl. X.R.

260—32.6 N, 37 N, 47 G, 78 R, 404.5; 404—19